April 8, 1952     C. L. LE MOIR     2,592,045
LEG REST
Filed Feb. 6, 1950
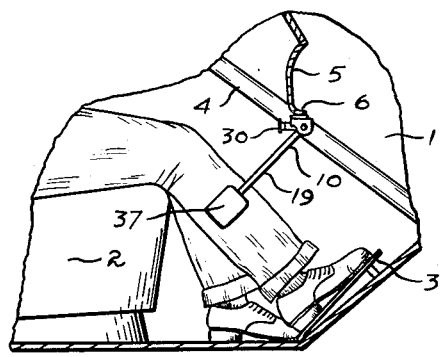
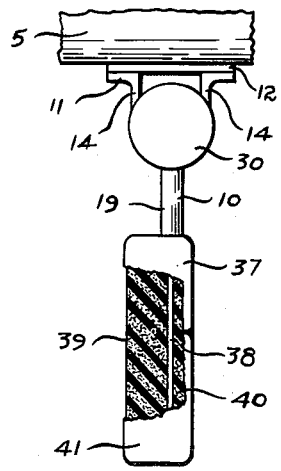
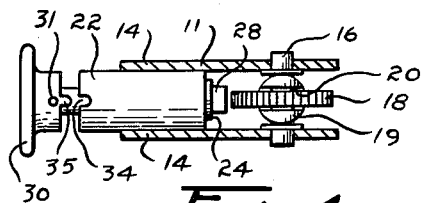
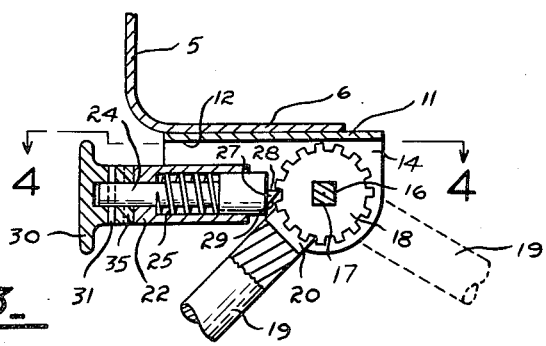
INVENTOR
CHARLES LOUIS LE MOIR
ATTORNEY Patented Apr. 8, 1952

2,592,045

UNITED STATES PATENT OFFICE 2,592,045

LEG REST

Charles Louis Le Moir, Vancouver,
British Columbia, Canada

Application February 6, 1950, Serial No. 142,650

2 Claims. (Cl. 155—165)

My invention relates to improvements in leg rests.

The driver of an automobile often experiences considerable strain and fatigue in operating the accelerator of the vehicle. This is particularly the case in long distance driving, but even when driving in hilly country or in heavy city traffic the accelerator operating leg of the driver is subjected to continuous tension, although to a lesser degree.

It is therefore the principal object of the present invention to provide a leg rest which will limit the outward movement of the driver's leg and thus relieve it of this strain and fatigue. Further objects of the invention are to provide a leg rest which is hingedly connected to the instrument panel; to provide a leg rest which may be swung into position of use or to an inoperative position behind the instrument panel while the car is in motion and to provide a leg rest which may be adjusted to any position of angularity to suit the desires of different drivers. These and still further objects will become apparent in the following specification and accompanying drawings, in which:

Figure 1 is a fragmentary view showing the leg rest secured to the instrument panel of an automobile to support the right leg of the driver.

Figure 2 is a front elevational view showing the leg rest in extended or leg supporting position.

Figure 3 is a part longitudinal sectional view of the invention.

Figure 4 is a plan view taken on the line 4—4 of Figure 3.

In the drawings like characters of reference indicate corresponding parts in each figure.

The numeral 1 indicates an automobile having the conventional seat 2, accelerator pedal 3, steering column 4 and instrument panel 5. The instrument panel 5, as is the case with most present day cars, is provided with a lower flange 6 and secured to said flange in a position slightly to one side of the accelerator pedal 3 is the leg rest which is generally indicated by the numeral 10.

The leg rest 10 consists of a bracket 11 having a top wall 12 and spaced side walls 14, which bracket is adapted to be fastened to the underside of the flange 6 by any suitable clamping device or bolts, not shown. Journalled in the side walls 14 is a pin 16 having a squared centre portion 17 and secured to said centre portion is a ratchet wheel 18. An arm 19 having a forked upper end 20 is secured to the centre portion 17 with the ratchet wheel 18 disposed within said fork.

Secured between the side walls 14 is a cylindrical sleeve 22 having its longitudinal axis aligned with the centre of the ratchet wheel 18. A plunger 24 is mounted for endwise movement within the sleeve 22, which plunger is urged towards the ratchet wheel by means of a spring 25. The inner end of the plunger is fitted with a triangular shaped pawl 27 adapted to engage the teeth of the ratchet wheel 18 and having a horizontal face 28 and a sloping face 29. A flanged knob 30 is secured to the outer end of the plunger by means of a pin 31, which knob normally projects from the instrument panel 5 a distance equal to the other controls located thereon. A vertical slot 34 is provided on the outer end face of the sleeve 22, which slot is adapted to receive a rib 35 located on the adjacent end face of the knob 30.

The lower end of the arm 19 is fitted with a resilient leg pad 37 which is preferably constructed as shown in Figure 2. A rectangular plate 38 is secured to the arm and sponge rubber blocks 39 and 40 are cemented on opposite sides of said plate. The block 39, which is located on the left or driver's side of the leg rest, is of greater thickness than the block 40 to ensure that the driver's leg will be adequately cushioned against road shock. A suitable cover 41 of leather or the like completely encloses the plate 38 and blocks 39 and 40, so that the pad cannot damage the clothing of either the driver or passenger of the car.

When in use as shown particularly in Figure 1, the leg rest is adjusted to a position where it will most comfortably support the driver's right leg against side movement to the right as the foot rests upon the accelerator pedal. The leg is relieved of much of the strain incidental to operating the vehicle and is unhampered in its movement from accelerator pedal to brake and return. In position of use the teeth of the ratchet wheel 18 engage the horizontal face 28 of the pawl 27 as shown in Figure 3. When the leg rest is no longer required, the knob 30 is pulled to retract the plunger 24 to disengage the pawl from the teeth of the ratchet wheel and withdraw the rib 35 from the slot 34, see Figure 4. The knob may then be turned through 180 degrees either to the right or left so that the sloping face 29 of the pawl is placed uppermost, whereupon the knob is released and the plunger is returned to its advanced position by the spring 25. This position of the pawl permits movement of the ratchet wheel in an anti-clockwise direction only as viewed in Figure 1, so that the leg rest may be swung well up under the instrument panel.

It will be readily seen that the provision for swinging the pad 37 forwardly and under the dash of the vehicle enables the driver or passenger to get into and out of their seats from either side of the car.

The device above described provides such comfortable support to the driver's leg, that even after prolonged periods at the steering wheel there is no risk of accidental acceleration of the vehicle due to fatigue.

What I claim as my invention is:

1. A leg rest adapted for attachment to the instrument panel of an automobile adjacent its accelerator pedal, said leg rest comprising a bracket to be secured to said panel, an arm having a ratchet wheel swingingly mounted in the bracket, said arm having a leg pad thereon, a sleeve carried by the bracket having a spring projected plunger, said plunger having a pawl adapted to engage the ratchet wheel to allow the arm to swing in one direction and to hold said arm against swinging in the opposite direction, said plunger having a knob at one end to facilitate the disengagement of the pawl from the ratchet wheel.

2. A leg rest adapted for attachment to the instrument panel of an automobile adjacent its accelerator pedal, said leg rest comprising a bracket to be secured to said panel, an arm having a ratchet wheel swingingly mounted in the bracket, said arm having a leg pad thereon, a sleeve carried by the bracket having a spring projected plunger, said plunger having a pawl adapted to engage the ratchet wheel to allow the arm to swing in one direction and to hold said arm against swinging in the opposite direction, said plunger having a knob at one end to facilitate the disengagement of the pawl from the ratchet wheel and to permit the pawl to be reversed in its action upon the ratchet wheel.

CHARLES LOUIS LE MOIR.

REFERENCES CITED

The following references are of record in the file of this patent:

UNITED STATES PATENTS

| Number | Name | Date |
|---|---|---|
| 235,304 | Smith | Dec. 7, 1880 |
| 278,973 | Kizer | June 5, 1883 |
| 1,035,739 | Raes | Aug. 13, 1912 |
| 1,986,555 | Carlson | Jan. 1, 1935 |
| 2,133,443 | Girl | Oct. 18, 1938 |